United States Patent [19]

McIntyre

[11] Patent Number: 5,256,853
[45] Date of Patent: Oct. 26, 1993

[54] METHOD FOR SHAPING CONTACT LENS SURFACES

[75] Inventor: Kevin J. McIntyre, Rochester, N.Y.

[73] Assignee: Bausch & Lomb Incorporated, Rochester, N.Y.

[21] Appl. No.: 738,704

[22] Filed: Jul. 31, 1991

[51] Int. Cl.$^5$ .............................................. B23K 26/06
[52] U.S. Cl. ........................... 219/121.75; 219/121.68; 219/121.69
[58] Field of Search ...................... 219/121.68, 121.69, 219/121.75

[56] References Cited

U.S. PATENT DOCUMENTS

| | | | |
|---|---|---|---|
| 4,162,122 | 7/1979 | Cohen | 351/161 |
| 4,194,814 | 3/1980 | Fischer | 351/160 |
| 4,219,721 | 8/1980 | Kamen | 219/121 |
| 4,307,046 | 12/1981 | Neefe | 264/1.4 |
| 4,340,283 | 7/1982 | Cohen | 351/161 |
| 4,563,565 | 1/1986 | Kampfer | 219/121 |
| 4,623,776 | 11/1986 | Buchroeder et al. | 219/121.67 |
| 4,642,112 | 2/1987 | Freeman | 623/6 |
| 4,642,439 | 2/1987 | Miller | 219/121 |
| 4,765,728 | 8/1988 | Porat | 351/160 |
| 4,838,266 | 6/1989 | Koziol | 128/303.1 |
| 4,842,782 | 6/1989 | Portney | 264/1.4 |
| 4,883,350 | 11/1989 | Muckenhirn | 351/160 |
| 4,997,250 | 3/1991 | Ortiz, Jr. | 350/96.18 |

FOREIGN PATENT DOCUMENTS

| | | |
|---|---|---|
| 16145/88 | 11/1990 | Australia . |
| 0005460 | 11/1979 | European Pat. Off. . |
| 0189027 | 7/1986 | European Pat. Off. . |
| 0291459 | 11/1988 | European Pat. Off. . |
| 8201494 | 5/1982 | World Int. Prop. O. . |

*Primary Examiner*—C. L. Albritton
*Attorney, Agent, or Firm*—David M. Krasnow; Craig E. Larson

[57] ABSTRACT

A method for shaping the surface of an optical target, said method comprising the steps of: addressing a ring of laser radiation to the surface of the optical target domain, said laser radiation being of sufficient fluency and energy to photoablate the material forming the body of said optical target domain, sweeping the optically functional portion of said target domain with said laser ring by effectively changing the radius of said ring in a prescribed fashion within the range of the radius of the optical target domain and zero.

5 Claims, 4 Drawing Sheets

METHOD FOR SHAPING CONTACT LENS SURFACES

BACKGROUND OF THE ART

Using laser irradiation to shape optical surfaces is well known in the art. For instance, U.S. Pat. No. 4,194,814 teaches a method for forming indicia on a contact lens using a laser. In particular, this patent teaches that certain critical characteristics, i.e. wavelength and intensity to sublimate the surface of the contact lens in order to form smooth indicia.

U.S. Pat. No. 4,219,721 describes a method for using a laser to mark indicia on clear, polymethacrylate intraocular lenses. In particular, the patent teaches an apparatus for accomplishing high quality indicia.

U.S. Pat. No. 4,307,046 teaches using a $CO_2$ laser to vaporize the surface of a contact lens blank and shape the blank into a lens. Essentially, this patent teaches using a laser beam as a cutting tool, much like a cutting tool used on a lathe which has been adapted to produce contact lenses. Thus this patented method depends upon the same techniques as those known in the prior contact lens manufacturing art.

U.S. Pat. No. 4,563,565 teaches a method for forming the edges of contact lenses. Again, critical to this process technology is the fluency of the laser, which is optimized by maximizing the ratio of heat of vaporization to heat absorbed by the polymer bulk. Furthermore, the process requires that the edge of the contact lens be indexed to the laser beam so that the lens can be rotated and thus effectively define the lens edge. The basic technology is similar to U.S. Pat. No. 4,307,046 except that it is specifically directed towards forming the edge of the lens rather than the surface of the lens.

U.S. Pat. No. 4,642,439 teaches a method for forming the edge of a contact lens made from silicone elastomer which employs a ring of laser radiation of the same radius as the desired dimension of the contact lens. The radius of said lens is fixed and the ring is employed only to form the edge of a lens. The method employs two laser rings to form the rounded edge of a contact lens. It does not teach using a ring of laser radiation to shape the optical surface or carrier surface of a lens.

U.S. Pat. No. 4,838,266 teaches process technology useful in modifying the surface of optical devices. The technology relies on the utilization of an attenuator which varies the energy distribution of the laser beam across the surface of the optical element being shaped. The technology depends upon fixing relative to one another, the laser beam, the optical article, and the attenuator.

U.S. Pat. No. 4,842,782 teaches a process technology using a laser to alter the surface of an optical device by way of employing a moving mask to vary the energy distribution across the surface of the optical surface.

None of the prior art techniques will produce axially symmetrical lenses and many of the techniques require orientation of the target specific to the laser beam in order to produce axial symmetry of any great degree.

SUMMARY OF THE INVENTION

The present invention relates to a novel method of controllably altering the surface of an optical element using laser irradiation sources to selectively photoablate said surfaces. Specifically, the present invention uses a ring of laser irradiation to ablate across the entire surface of an optical surface so as to alter the surface in a predetermined fashion. The entire surface of the optical unit is thus controllably altered by changing the effective radius of the laser ring as it impinges on said optical target surface. By controlling the effective radius of the ring on the target one can scan the ring and thus create, in effect, a photoablation gradient across the face of the target. This photoablation gradient will be rotationally symmetric.

DETAILED DESCRIPTION OF THE INVENTION

Figure 1:
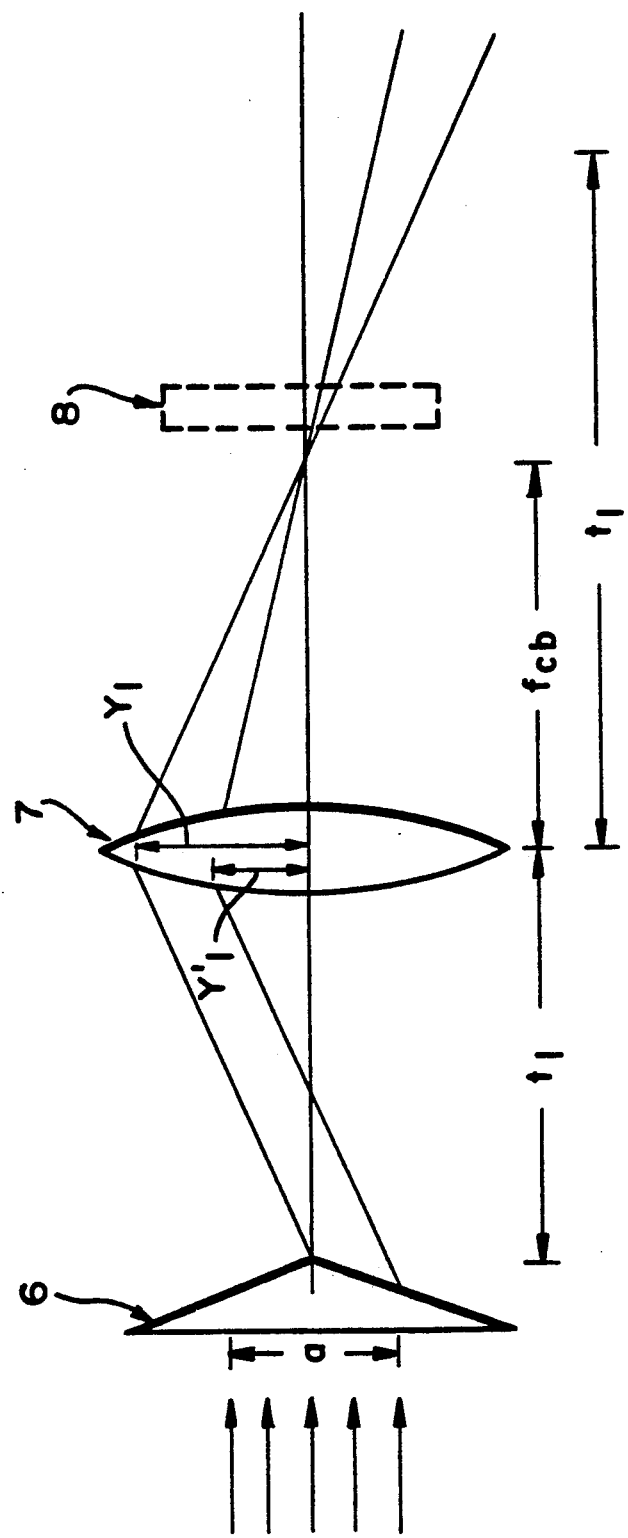
FIG. 1 schematically represents an apparatus used to practice the present invention which comprises an axicon, a plus lens element, a fixture to hold the target, means for changing the relative spacing between the plus lens and the axicon lens, and a laser radiation source.

The present invention relates to a novel method of shaping optical lenses and other refractive optical elements. This method employs the properties of axicon lenses in order to create an axially symmetric lens by using said axicon lens to form a ring of laser radiation whose radius can be controllably varied. Thus, the laser radiation can be swept across the face of the optical target surface and, in a predetermined fashion, photoablate said surface to modify it as desired.

The present invention is a general method for manufacturing optical elements and is particularly directed to the precise and accurate modification of surfaces which form optical elements. Particularly, the present invention teaches a method wherein a ring of laser radiation is used to scan across the domain of an optical element surface in order to controllably photoablate the domain surface and so modify it in a predetermined and desired manner. The laser ring is scanned over the whole domain by varying the effective radius of said ring in a predetermined function. Thus, by controlling the instantaneous fluency of the laser ring radius, one can effect an ablation profile which as a function as a distance from the center of the target domain defines a controlled photoablation as desired. Thus, one could readily modify a spherical surface to an aspheric surface.

In order to accomplish these effects, applicants provide several apparatae which provide laser rings which one can controllably vary the radius of the ring. One form of this as shown in FIG. 3 comprises a laser radiation source (1), an axicon lens element (2) which has a specified ray angle, $U_0$, which defines the angle from normal a beam is diverted, a plus lens element (3) which has a given power, $\phi_1$, a minus lens, element (4) which has a given power, $\phi_2$, a fixture to hold the target optical element (5) and a target optical element means for controlling the distance, $t_1$, between the plus lens and the minus lens elements $t_1$, means for controlling the distance between the axicon and the plus lens ($t_0$), and means for controlling the distance between the minus lens and the target ($t_2$).

Figure 3:
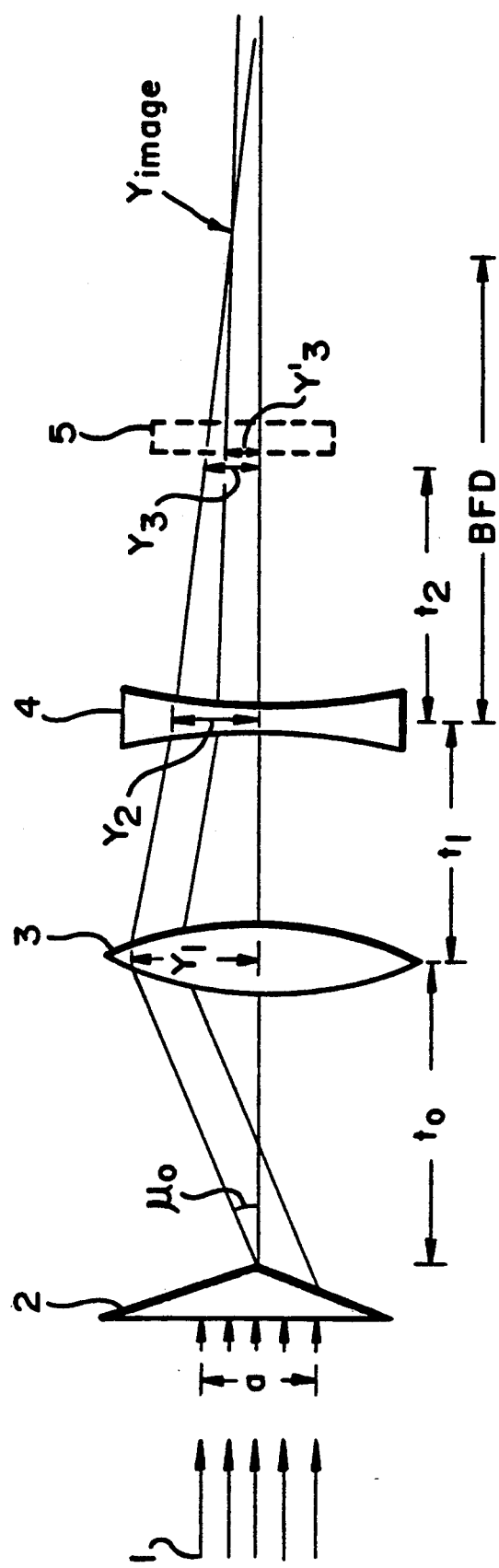
FIG. 3 shows a third apparatus for practicing the invention which comprises an axicon, a plus lens element, a minus lens element, a fixture to hold the target, means for changing the relative spacing between the plus lens and the minus lens, and a laser radiation source.

The radius of the laser ring incident on the target, using the apparatus shown in FIG. 3, depends upon the deviation produced by the axicon lens, the power of the plus lens element, the power of the minus lens element and the relative distances between the axicon lens and the first lens (either plus or minus); relative distance between the plus and minus lenses; and the relative distance between the optical target and the element lens. Thus, the ring's radius can be expressed as the formulae:

$$Y_3 = Ay_1 + BU_0$$

where
- $Y_3$ is the ring radius
- $Y_1$ is the ray height at the plus lens;
- A is $1 - (t_1 + t_2)\phi_1 - t_2\phi_2 + t_1 t_2 \phi_1 \phi_2$
- B is $(t_1 + t_2) - t_1 t_2 \phi_2$
- a is the aperture diameter of the beam The back focal distance (BFD) for this apparatus will be defined as:

$$BFD = t_2 = (1 - t_1\phi_1)/(\phi_1 + \phi_2 - t_1\phi_1\phi_2)$$

Image height will be:

$$Y_{image} = U_0/\phi \text{total}$$

where $$\phi \text{total} = \phi_1 + \phi_2 - t_1\phi_1\phi_2$$

The width of the ring will be:

$$\Delta = |\{1 - (t_1 + t_2)\phi_1 - t_2\phi_2 + t_1 t_2 \phi_1 \phi_2\} a/2)|$$

Thus, as a first order analysis, the ring radius and profile are well defined and can be controlled as a function of $t_1$.

Of course, the laser ring is not a focussed ring: there will be an intensity distribution across the radial cross-section of the ring that will change as the radius of the ring changes. The radial intensity distribution of the laser ring will depend upon the degree to which the ring is focussed as well as the quality or thickness of the lens elements employed in the invention. Optical aberrations will affect the profile as well as the properties of the radiation source. These characteristics may be analytically determined. Theoretically, however, the intensity profile can be determined experimentally as well. In any event, the intensity distribution of the laser ring profile will vary as a function of r. Thus, by experimentally determining this function across the range of r, one can operate the ring at each increment of r for a controlled time to produce an irradiation profile which will effect a desired ablation profile.

FIG. 1 shows a schematic representation of another apparatus which can be employed in the practice of the present invention. In this apparatus an axicon lens (6) and a plus power lens (7) are employed to effect a laser ring incident on the optical target. The ring's radius can be controlled by the distance between the plus lens and the axicon lens, and/or the distance between the optical target (8) and the plus lens (7) designated as $t_1$. However, as a practical matter, the difference between the target and the lens is easiest to control.

Once again, the radial profile of the laser will depend upon the degree to which the plus lens focuses the ring on the optical target.

The profile will vary in intensity as the effective radius of the ring changes. This intensity distribution can be measured and quantified to describe a function as a variable of r, and again a scan profile can be calculated to describe a desired ablation profile.

Figure 2:
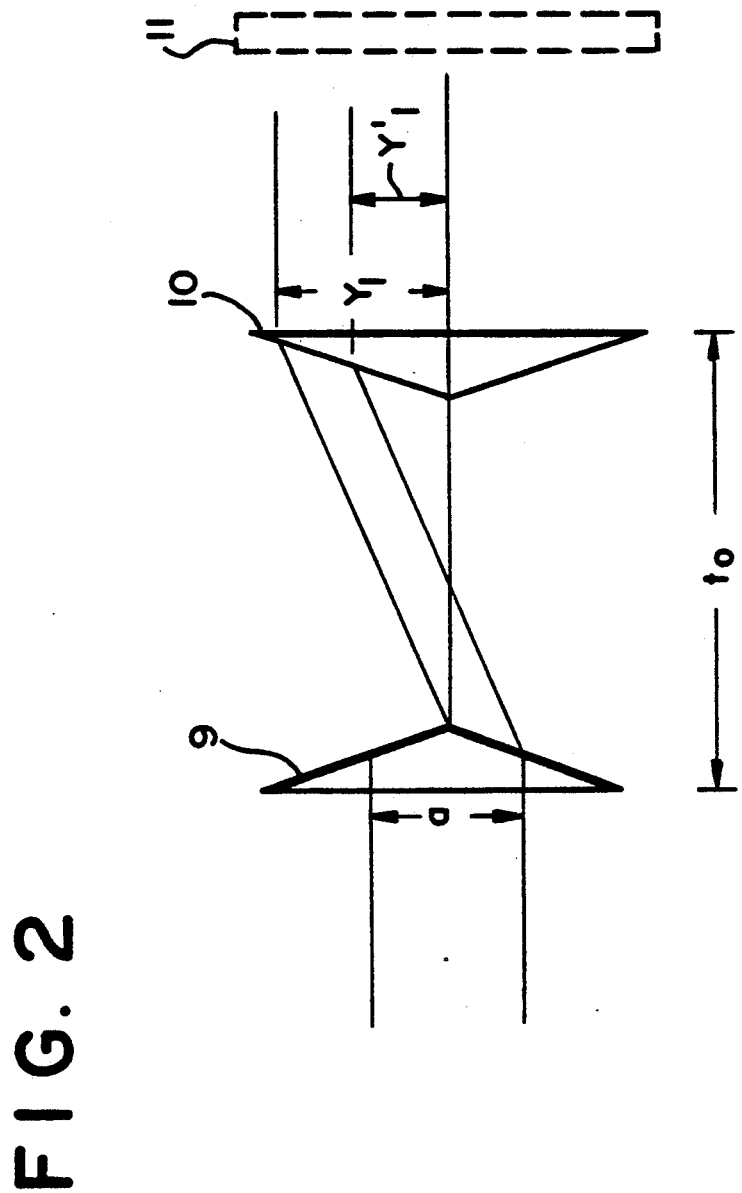
FIG. 2 shows a second apparatus for practicing the invention which comprises a first axicon lens, a second axicon lens, a fixture to hold the target, means for changing the relative spacing between the two axicon lenses, and a laser radiation source.

Another apparatus which can be used to practice the present invention is schematically described by FIG. 2. In this scheme, two axicon lenses (9) and (10) are used to form the laser ring. The distance between the two axicon lenses ($t_0$) determines the radius of the laser ring. The ring produced by such an apparatus will not require focusing since the cylinder defining the ring runs parallel along the common axis of the two axicon lenses. The outer ring diameter will be defined as:

$$Y_1 = U_0 t_0$$

where
- $Y_1$ is the outer ring diameter;
- $U_0$ is the axicon angle; and
- $t_0$ is the distance between the axicons.

The inner ring radius will be:

$$Y'_1 = Y_1 - a/2;$$

where $Y'_1$ is the inner diameter;
- $Y_1$ is the outer diameter; and
- a is the beam aperture.

Thus, the effective ring structure will largely be a function of beam aperture, axicon angle, and the distance between the axicons, ($t_0$), and will not be sensitive to the distance between the axicon and the target (11).

Figure 4:
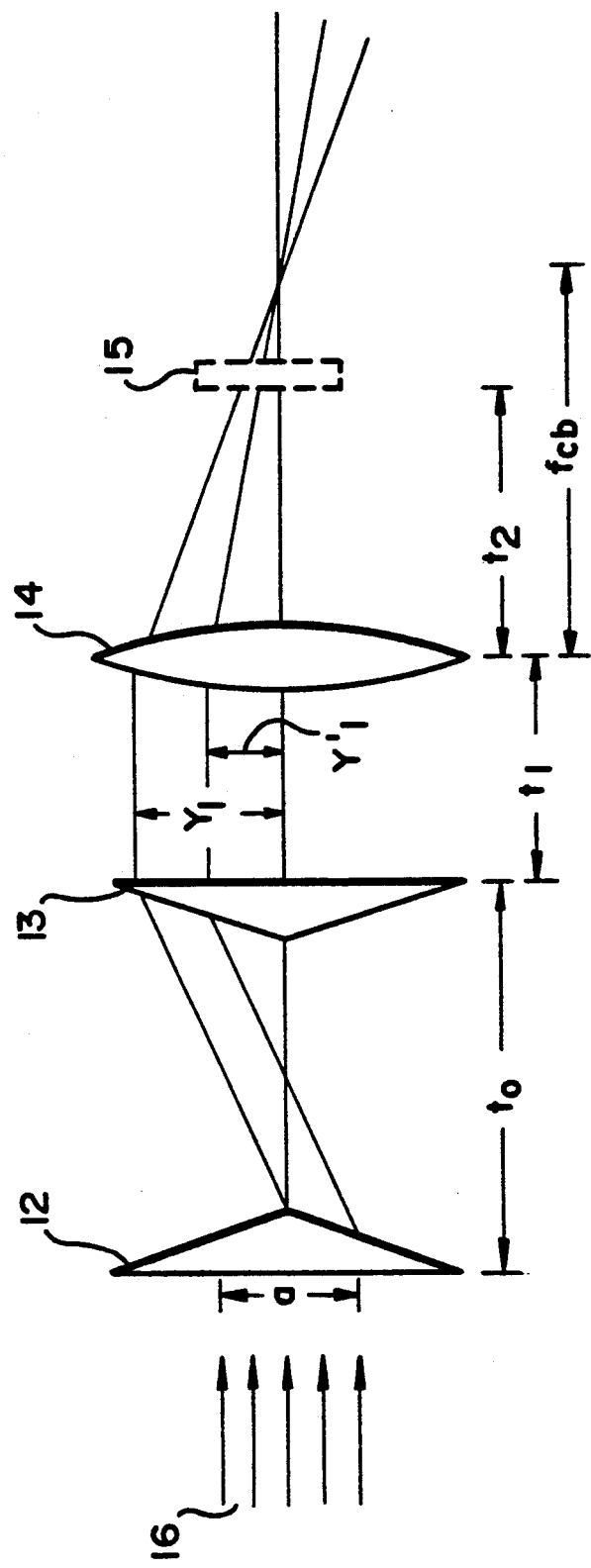
FIG. 4 shows a fourth apparatus which comprises a first axicon lens, a second axicon lens, a plus lens element aligned along the axis of a laser source's irradiation and means for holding an optical target.

Another apparatus which can be employed in the practice of the invention is shown in FIG. 4 and is comprised of:
- a first axicon lens (12);
- a second axicon lens (13);
- a plus power lens (14);
- a radiation source (15); and
- means for holding a target optical substrate (16.)

where
- a = aperture diameter;
- $\phi_1$ = the power of the plus lens;
- $U_0$ = ray angle after the first axicon lens;
- $U_1$ = ray angle after the second axicon lens;
- $U_2$ = ray angle after the plus lens;
- $Y_1$ = ray height at the first axicon lens;
- $Y_2$ = ray height at the second axicon lens;
- $Y_3$ = ray height at a distance, $t_2$, from the plus lens;
- $t_0$ = distance between the first and second axicon lenses;
- $t_1$ = the distance between the second axicon lens and the plus lens;
- $t_2$ = distance between the plus lens and the target; and
- f = the focal length of the plus lens.

Then, the width of the ring $\Delta$ will be $$\Delta = (1 - t_2\phi_1)a/2$$

and the outer ring radius ($Y_3$) outside the plus lens will be:

$$Y_3 = Y_2(1 - t_2\phi_1) = Y_1(1 - t_2\phi_1) = Y_2 - t_2 Y_2/f$$

Therefore, ring radius can be controlled by varying $t_2$.

The present method is particularly suited to making aspheric lenses which are of particular utility in the area of rigid gas permeable lenses. Since rigid gas permeable lenses are by definition far less flexible than soft lenses, they must be designated to fit comfortably on the eye. Hence, rigid gas permeable lenses often incorporate nonspherical designs. Such designs are exemplified by U.S. Patent Nos. 4,765,728 and U.S. Pat. No. 4,883,350.

The present method is particularly suited to manufacturing such designs in that it is capable of precisely reshaping a spherical contact lens blank to a defined aspheric surface. Furthermore, the surface so produced may not require further polishing. In state of the art manufacturing techniques, which require polishing, the resulting surfaces manufactured tend to be more spherical after polishing than would be expected from the design cut by the lathe. Thus, the present invention allows for a more desired correlation between designed shape and actual shape than has been possible before.

The present method may also be used to produce discontinuance designs such as the designs taught in U.S. Pat. No. 4,642,112, U.S. Pat. No. 4,340,283 or U.S. Pat. No. 4,162,122. Such discontinuities may be produced by introducing discontinuities into the scan profile of the laser ring by way of process during the sweep, or abrupt accelerations. It has been found that the present process works effectively on contact lens materials with relatively low degrees of crosslinking such as polyhydroxyethyl methacrylate, polyvinyl pyrrolidinone, polymethyl methacrylate.

The optical components of the apparatae used to practice the invention must transmit the wavelength of laser radiation being employed. All of the optical components are generally available from commercial sources. For instance, axicon lenses made of UV grade fused silica can be obtained from Tucson Optical Research, located in Tucson, Ariz. U.S.A.. Suitable plus and minus lenses are also available from commercial sources.

What is claimed is:

1. A method for modifying the surface of an optical target, said method comprising the steps of:
    a) addressing a ring of laser radiation to said surface of the optical target, said laser radiation being of sufficient fluency and energy to photoablate material from the surface of said optical target;
    b) orienting the ring of laser radiation at the edge of the optical target; and
    c) sweeping the laser beam over the optical target by decreasing the radius of the ring of laser radiation such that the surface of said optical target is scanned and predictably altered.

2. A method for modifying the surface of an optical target, said method comprising the steps of:
    addressing a ring of laser radiation to said surface of the optical target, said laser radiation being of sufficient fluency and energy to photoablate material from the surface of said optical target;
    b) orienting the ring of laser radiation as near a point as possible at the center of the optical target; and
    c) sweeping the laser beam over the optical target by increasing the radius of the ring of laser radiation such that the surface of said optical target is scanned and predictably altered.

3. The method of claims 1 or 2 wherein the ring of laser radiation is formed by use of at least one axicon lens.

4. An apparatus for shaping the surface of an optical target which comprises:
    a) means for holding said optical target in a predefined position;
    b) laser irradiation means capable of photoablating the material which forms said optical target, and
    c) means for forming a ring of laser irradiation, capable of controllably photoablating the surface of said optical target comprising a first axicon lens element, a second axicon lens element oriented 180 degrees away from said first axicon lens element, a plus lens element, wherein said lens elements are disposed in seriatim from said laser irradiation means and said optical target in the order of first axicon lens element, second axicon lens element and said plus lens element, said means being capable of changing the radius of said laser ring, and said means being disposed between said irradiation means and the optical target holding means.

5. An apparatus for shaping the surface of an optical target which comprises:
    a) means for holding said optical target in a predefined position;
    b) laser irradiation means capable of photoablating the material which forms said optical target, and
    c) means for forming a ring of laser irradiation, capable of controllably photoablating the surface of said optical target comprising a laser irradiation means, a first axicon lens element, a second axicon lens element, a plus lens element, said means being capable of changing the radius of said laser ring, said means being disposed between said irradiation means and the optical target holding means wherein said first axicon lens element, said second lens element, said plus lens element and said optical target surface holding means are aligned along the axis defined by the laser beam produced by said laser irradiation means.

* * * * *